United States Patent
He

(10) Patent No.: US 12,404,418 B2
(45) Date of Patent: Sep. 2, 2025

(54) SCENARIO-ADAPTABLE COLOR-CHANGING INK AND SOLAR GLASS PRODUCT

(71) Applicant: Hangzhou Bomei Solar Energy Technology Co., Ltd., Zhejiang (CN)

(72) Inventor: Ping He, Hangzhou (CN)

(73) Assignee: Hangzhou Bomei Solar Energy Technology Co., Ltd, Hangzhou (CN)

( * ) Notice: Subject to any disclaimer, the term of this patent is extended or adjusted under 35 U.S.C. 154(b) by 867 days.

(21) Appl. No.: 17/570,350

(22) Filed: Jan. 6, 2022

(65) Prior Publication Data

US 2022/0127482 A1    Apr. 28, 2022

Related U.S. Application Data

(63) Continuation of application No. PCT/CN2020/089154, filed on May 8, 2020.

(30) Foreign Application Priority Data

Sep. 16, 2019 (CN) .......................... 201910872650.8

(51) Int. Cl.
*C09D 11/50* (2014.01)
*C03C 4/06* (2006.01)

(52) U.S. Cl.
CPC ............... *C09D 11/50* (2013.01); *C03C 4/06* (2013.01)

(58) Field of Classification Search
CPC ... B05D 5/00; C03C 17/009; C03C 2217/445; C03C 2217/485; C03C 2217/72; C03C 4/06; C09D 11/03; C09D 11/037; C09D 11/101; C09D 11/102; C09D 11/50
See application file for complete search history.

(56) References Cited

FOREIGN PATENT DOCUMENTS

| CN | 101481557 A | 7/2009 |
|---|---|---|
| CN | 101962492 A | 2/2011 |
| CN | 102634251 A | 8/2012 |
| CN | 103666073 A | 3/2014 |
| CN | 103666093 A | 3/2014 |
| CN | 104024352 A | 9/2014 |
| CN | 104789039 A | 7/2015 |
| CN | 104845446 A | 8/2015 |
| CN | 110437676 A | 11/2019 |

OTHER PUBLICATIONS

CN102634251B (Year: 2012).*
International Search Report (PCT/CN2020/089154); Date of Mailing: Jul. 24, 2020.
First Office Action(201910872650.8); Date of Mailing: Mar. 15, 2021.
The second Office Action(201910872650.8); Date of Mailing: Jul. 8, 2021.
The third Office Action(201910872650.8); Date of Mailing: Aug. 16, 2021.
Electron beam curing coating and its application(machine translation); Date of Mailing: Dec. 30, 2014.
Anti-corrosion coating technology and equipment application manual(machine translation); Date of Mailing: Jun. 30, 2004.
Engineering materials(machine translation); Date of Mailing: Feb. 28, 2018.

* cited by examiner

*Primary Examiner* — Shuangyi Abu Ali
(74) *Attorney, Agent, or Firm* — Wiersch Law Group

(57) ABSTRACT

A scenario-adaptable color-changing ink and a corresponding solar glass product are provided. The ink includes 7-30 parts by weight of photopolymer, 8-20 parts by weight of photoactive monomer, 1-5 parts by weight of photosensitizer, 30-55 parts by weight of weather-resistant resin, 1-10 parts by weight of curing agent, and 1-15 parts by weight of pearlescent pigment. The pearlescent pigment is at least one interference pearlescent pigments with weather-resistance, which has no color. Each sheet of the pearlescent pigment can be considered as a miniature prism which can break the white composite light into colorful monochromatic light, thus allow the coating of the printing ink to present a beautiful pearl luster and metallic luster. The pattern color which is visible by human is a result of overlaps and interferes of lights that the incident light is multiply reflected and refracted by the sheets of transparent pearlescent pigment.

6 Claims, No Drawings

SCENARIO-ADAPTABLE COLOR-CHANGING INK AND SOLAR GLASS PRODUCT

TECHNICAL FIELD

This disclosure relates to a technical field of surface decoration of solar cell panels, and particularly to a scenario-adaptable color-changing ink and a solar glass product.

BACKGROUND

Solar photovoltaic cells are a novel type of electricity generation system which converts solar radiation energy into electric energy based on photovoltaic effect of a material upon exposure to light. The most common solar photovoltaic cells include crystalline silicon solar photovoltaic cells, thin film solar photovoltaic cells, perovskite solar photovoltaic cells, and etc.

The crystalline silicon solar photovoltaic cells has the largest market dominance, while the thin film solar photovoltaic cells and the perovskite solar photovoltaic cells are in the initial stage of commercialization.

From the outside toward the inside, the crystalline silicon solar photovoltaic cells are generally composed of tempered glass, EVA film, monocrystalline silicon or polycrystalline silicon solar cell sheet with high conversion efficiency, EVA film, and backplane. These components are secured with an aluminum alloy frame. The color of crystalline silicon solar photovoltaic module is dark due to the monocrystalline silicon or polycrystalline silicon solar cell sheet reflecting dark blue or black.

The crystalline silicon solar photovoltaic cells are mainly used either in a centralized or distributed deployment pattern. In a centralized manner, electricity generated by a solar photovoltaic power station is transmitted to power grid, and the generated electricity is uniformly allocated to users. However, it requires a large investment, long construction period, and large bulk. In a distributed manner, solar photovoltaic cells are deployed/installed near user's location. Such deployment manner is guided by the principle of "implementing power generation, grid-connection, conversion and use near the user's location". This not only effectively increases the power generated by photovoltaic power stations that in the same scale, but also resolves the problem of power loss during boosting and long-distance transportation.

The distributed crystalline silicon solar photovoltaic cells are mainly installed on roofs of houses, factories and commercial buildings, and on glass curtain wall, which are mainly distributed in urban area and suburb. Currently, the crystalline silicon solar photovoltaic cell can only be used for power generation, as its dark blue or black appearance is extremely incompatible with the surrounding environment. Given that, the crystalline silicon solar photovoltaic cells under current appearance are unable to meet the high requirement of environmental aesthetics, and it may even cause light pollution in urban area. Thereby, the commercial promotion of distributed crystalline silicon solar is limited on the application of roofs and curtain walls.

As part of the outdoor environment of a building, solar roofs or solar glass curtain walls need to meet the requirements of both power generation and artistic decoration. The further development of solar photovoltaics is targeted to be high-power, low-cost, and aesthetic, which will serve to decorate and functionalize our surrounding environment. Accordingly, the development of building integrated photovoltaic (BIPV) solar roofs and curtain walls will be an inevitable trend in photovoltaic industry.

During its transformation and upgrading, a huge technology barrier of distributed solar photovoltaic cells is how to present a beautiful visual art effect based on a dark blue or a black crystalline silicon substrate, meanwhile, without reducing light transmittance and decreasing photoelectric conversion efficiency.

SUMMARY

The purpose of the present disclosure is to provide a scenario-adaptable color-changing ink for decorating solar glass panel decoration and solar glass products using the same. The ink is able to clearly show decorative patterns on a dark background, while maintaining a high transmittance.

To achieve the above purpose, the present disclosure provides the following technical solutions. A scenario-adaptable color-changing ink is provided, wherein the ink includes 7-30 parts by weight of photopolymer, 8-20 parts by weight of photoactive monomer, 1-5 parts by weight of photosensitizer, 30-55 parts by weight of weather-resistant resin, 1-10 parts by weight of curing agent, 1-15 parts by weight of pearlescent pigment, 0-3 parts by weight of adhesion promoter, 0-3 parts by weight of ultraviolet absorber, and 0-1 part by weight of antifoaming agent.

The pearlescent pigment is prepared by coating mica with several layers of metal oxide films. Different pearlescent effects can be produced by changing the layers of the metal oxide films. Moreover, as the pearlescent pigment has high refractive index and desirable transparency, it can present the same effect as that of a pearl luster in a transparent medium. There are preferably 6-12 parts by weight of the pearlescent pigment. There are preferably 15-22 parts by weight of the photopolymer, 12-16 parts by weight of the photoactive monomer, and 2-3 parts by weight of the photosensitizer. For the photopolymer, photoactive monomer, photosensitizer, and pearlescent pigment, a photo-curing reaction such as radiation polymerization or radiation crosslinking occurs under ultraviolet light irradiation, by which a coating film is cured and dried to form an adhesion layer with desirable adhesion strength to substrates. The pearl powder suspended in the coating, will not sink or accumulate at the bottom of the coating, between the pearlescent sheet to form a light transmission channel, improve the coating transmission rate, so that as much sunlight as possible to the battery surface, improve the efficiency of power generation. There are preferably 40-50 parts by weight of the weather-resistant resin and 6-8 parts by weight of the curing agent. A transparent fluorocarbon surface protective layer with desirable weather resistance, high hardness and low shrinkage, desirable leveling and scratch resistance can be formed through heating weather-resistant resin and curing agent to react. The formed coating film, which is synthesized from aforementioned scenario-adaptable color-changing ink, is able to present a beautiful visual art effect without changing light transmittance.

There are preferably 1-2 parts by weight of the adhesion promoter. The adhesion promoter mentioned above has desirable solubility. With a small amount of application, it can significantly increase the adhesion between layer and substrate, resulting in an improvement of moisture resistance, salt spray corrosion resistance, and heat resistance of the coating formed by the scenario-adaptable color-changing ink.

There are preferably 1-2 parts by weight of ultraviolet absorber. The above ultraviolet absorber can absorb ultraviolet light (especially that with a wavelength of 290-400 nm) strongly. It will extend the service life of the transparent coating without affecting photoelectric conversion efficiency of solar cell, as ultraviolet light makes little contribution to photoelectric conversion efficiency.

There are preferably 0.2-0.6 parts by weight of the antifoaming agent. During the printing of the scenario-adaptable color-changing ink, this above antifoaming agent can inhibit generating foams or eliminating existing foams through reducing the surface tension of the mixture to be coated.

As an optimization of this present disclosure, the pearlescent pigment is at least one from the group consisting of interference pearlescent pigments. The interference pearlescent pigment, also known as rainbow pigment, is a kind of titanium-mica pearlescent pigment, which has no color itself. Its coloring principles are the same as that of natural rainbow. The color displayed by the pearlescent pigment is a typical pseudo color. Each sheet of the pearlescent pigment actually can be considered as a micro prism that breaks with composite light into colorful monochromatic light, thus, allowing the coating of printing ink presenting a beautiful pearl luster and metallic luster. The pattern color which is visible by human is a result of overlaps and interferes of lights that the incident light is multiply reflected and refracted by the sheets of transparent pearlescent pigment.

Printing aforementioned interference pearlescent pigment on transparent glasses or transparent plastic sheets to form pearlescent patterns. Such pearlescent patterns present a transparent color with almost no color can be observed, therefore, the pearlescent patterns will not affect light transmittance and photoelectric conversion efficiency of crystalline silicon cells.

Printing aforementioned interference pearlescent pigment on white substrates to form pearlescent patterns. The pearlescent patterns color observed is white which is a reflection color of the substrate.

Printing aforementioned interference pearlescent pigment on dark substrates to form pearlescent patterns. The surface color observed is a result of mutual interferences and overlaps of light reflected by the multilayer pearlescent wafers and coatings. However, the color of dark substrate is not visible.

In addition to being used for decoration of solar glass products, the scenario-adaptable color-changing ink in this present disclosure can also be used for surface printing of other glass products, such as glass panels of household appliances, glass decoration of mobile phones, and the like.

The scenario-adaptable color-changing ink in this present disclosure has a broad application to print various glass substrates, such as ultra-clear glass, common glass, physical tempered glass, chemical tempered glass, composite of ceramic and glass, and the like.

The scenario-adaptable color-changing ink in this present disclosure can also be printed on the surface of ceramic, metal, and transparent plastic substrate.

As a further improvement of this present disclosure, the pearlescent pigment is at least one from the group consisting of natural mica, synthetic mica, and transparent glass substrate.

As a further improvement of this present disclosure, the weather-resistant resin is an amorphous resin. Such amorphous weather-resistant resin mentioned above has high transparency and is able to form a strong and tough film after cross-linking and curing under room temperature or under heating. With no effect on the light transmittance of the film formed by the scenario-adaptable color-changing ink, the film also serves as a protective film protecting the color patterns of glass panel, so that the color pattern can withstand the harsh requirements for a long-term outdoor weather resistance.

As a further improvement of the present disclosure, the weather-resistant resin is at least one type from the group consisting of fluorocarbon resin and polysiloxane resin. The structure of the alternating copolymer of vinyl fluoride and vinyl ether affords the products not only desirable durability, but excellent chemical resistance and good compatibility with UV resin Since the bond energy of fluorocarbon resin backbone possessing alternating copolymer structure is even greater than the maximum energy of ultraviolet rays in nature light, thereby, the weather-resistant resin which is fluorocarbon resin or polysiloxane resin will not crack under exposure of sunlight.

The photopolymer is at least one from the group consisting of organosilicon polyurethane acrylate, polybutadiene polyurethane acrylate, cyclic acrylate esterified acrylate, and hydrophobic polyester polyurethane acrylate (specifically, hydrophobic polyester polyurethane acrylate with 2-6 degrees of functionality).

The photoactive monomer is at least one from the group consisting of isobornyl acrylate, isobornyl methacrylate, tetrahydrofurfuryl (EO) acrylate, 1,6-hexanediol diacrylate, neopentyl glycol propoxylate diacrylate, and tris(2-(acryloyloxy)ethyl) isocyanurate.

The photosensitizer is at least one from the group consisting of 1-hydroxycyclohexyl phenyl ketone, 2-hydroxy-2-methyl-1-phenylpropan-1-one, and 2,4,6-trimethylbenzoyldiphenyl phosphine oxide.

The curing agent is at least one from the group consisting of amino resin with high solid content, polyisocyanate, and endcapped hexamethylene diisocyanate.

The adhesion promoter is at least one from the group consisting of phosphate acrylate, amino silane coupling agent, methacryloxy silane coupling agent, and epoxy silane coupling agent.

As a further improvement of this present disclosure, the scenario-adaptable color-changing ink further includes 0-3 parts by weight of ultraviolet absorber.

As a further improvement of this present disclosure, the scenario-adaptable color-changing ink further includes 0-1 part by weight of antifoaming agent.

As a further improvement of this present disclosure, the photopolymer is at least one from the group consisting of hydrophobic polyester polyurethane acrylate with 2-6 degrees of functionality, organosilicon polyurethane acrylate, polybutadiene polyurethane acrylate, and cyclic acrylate esterified acrylate.

The photoactive monomer is at least one from the group consisting of isobornyl acrylate, isobornyl methacrylate, tetrahydrofurfuryl (EO) acrylate, 1,6-hexanediol diacrylate, neopentyl glycol propoxylate diacrylate, and tris(2-(acryloyloxy)ethyl) isocyanurate.

The photosensitizer is at least one from the group consisting of 1-hydroxycyclohexyl phenyl ketone, 2-hydroxy-2-methyl-1-phenylpropan-1-one, and 2,4,6-trimethylbenzoyldiphenyl phosphine oxide.

The curing agent is at least one from the group consisting of amino resin with high solid content, polyisocyanate, and endcapped hexamethylene diisocyanate.

As a further improvement of the present disclosure, the adhesion promoter is at least one from the group consisting of phosphate acrylate, amino silane coupling agent, methacryloxy silane coupling agent, and epoxy silane coupling agent.

Compared with the Prior Art, the Present Disclosure has the Following Significance Efforts:

In this present disclosure, a photo-curing reaction such as radiation polymerization or radiation crosslinking will occur under ultraviolet light among photopolymer, photoactive monomer, photosensitizer, and pearlescent pigment, generating a cured and dry coating film, thus pearl powder suspended in the coating, will not sink or accumulate at the bottom of the coating, between the pearlescent sheet to form a light transmission channel, improve the coating transmission rate, so that as much sunlight as possible to the battery surface, improve the efficiency of power generation, and forming a good adhesion to the substrate adhesion layer. A transparent fluorocarbon surface protection layer with desirable weather resistance, high hardness and low shrinkage, desirable leveling and scratch resistance can be achieved through the thermal reaction of weather-resistant resin and curing agent, which makes the scenario-adaptable color-changing ink-based coating film presenting a beautiful visual art effect while hardly affecting light transmittance.

DESCRIPTION OF EMBODIMENTS

For further illustration, this disclosure is described in details with following examples.

Example 1

A scenario-adaptable color-changing ink was provided, including 7 parts by weight of photopolymer, 8 parts by weight of photoactive monomer, 1 part by weight of photosensitizer, 30 parts by weight of weather-resistant resin, 1 part by weight of curing agent, 1 part by weight of pearlescent pigment.

The photopolymer was hydrophobic polyester polyurethane acrylate with 2-6 degrees of functionality, specifically, it was RUA-064S-8 from Asia Corporation, Japan; the photoactive monomer was isobornyl acrylate (IBOA); the photosensitizer was 1-hydroxycyclohexyl phenyl ketone (184); the weather-resistant resin was fluorocarbon resin, specifically, it was fluorocarbon resin from 3F Zhonghao New Chemical Materials Co., Ltd. An example of the fluorocarbon resin is alternating copolymer JF-3X synthesized from trifluorochloroethylene and vinyl ester (with content of fluorine of 25±0.5%, hydroxyl value (mgKOH/g/solid) of 50±5, and solid content of >50%). Such fluorocarbon resin could be crosslinked at room temperature or cured under baking at high temperature by using amino or blocking isocyanate as crosslinking agent; the curing agent was polyisocyanate, specifically, it was a blocked isocyanate curing agent from DONGGUAN JIANG XING INDUSTRIAL Co., Ltd, for example, curing agent JX-628 (with a solid content of 85%, a NCO content of 12±0 0.5%, and a blocking temperature of >120° C.), room-temperature curing agent JX-519 (with a solvent of ethyl acetate, a solid content of 80±2%, and a NCO content of 15±0.5%); the pearlescent pigment was interference pearlescent pigment, specifically, it was orange pearl powder 2216 from Hebei Oxen New Materials Co., Ltd.

Example 1-1

The photopolymer used in this example was polyurethane acrylate EB4680 from Allnex, Shanghai. The ink produced in Example 1-1 can achieve a similar performance as that of the ink produced in Example 1.

Example 1-2

The photopolymer used in this example was acrylate esterified acrylate ACAZ-251, The ink produced in Example 1-2 can achieve a similar performance as that of the ink produced in Example 1.

Example 1-3

The photopolymer used in this example was acrylate esterified acrylate ACAZ-300. The ink produced in Example 1-3 can achieve a similar performance as that of the ink produced in Example 1.

Example 1-4

The photopolymer used in this example was polyurethane acrylate FA07468 from Shanghai Baorun Chemical Co., Ltd. The ink produced in Example 1-4 can achieve a similar performance as that of the ink produced in Example 1.

Example 1-5

The photopolymer used in this example was polybutadiene dimethacrylate CN301 from Sartomer. The ink produced in Example 1-5 can achieve a similar performance as that of the ink produced in Example 1.

Example 1-6

The photopolymer used in this example was polybutadiene dimethacrylate CN303 from Sartomer. The ink produced in Example 1-6 can achieve a similar performance as that of the ink produced in Example 1.

Example 1-7

The photopolymer used in this example was Dymax hydrophobic polyurethane acrylate BR-643. The ink produced in Example 1-7 can achieve a similar performance as that of the ink produced in Example 1.

Example 1-8

The photopolymer used in this example was Dymax hydrophobic polyurethane acrylate BRC-843S. The ink produced in Example 1-8 can achieve a similar performance as that of the ink produced in Example 1.

Example 1-9

The photopolymer used in this example was polybutadiene polyurethane acrylate BR-641D. The ink produced in Example 1-9 can achieve a similar performance as that of the ink produced in Example 1.

Example 1-10

The photopolymer used in this example was polybutadiene polyurethane acrylate BR-641E. The ink produced in Example 1-10 can achieve a similar performance as that of the ink produced in Example 1.

Example 1-11

The photopolymer used in this example was weather-resistant resin solution G001026 from DSM. The ink produced in Example 1-11 can achieve a similar performance as that of the ink produced in Example 1.

Example 1-12

The photoactive monomer used in this example was isobornyl methacrylate (IBOMA). The ink produced in Example 1-12 can achieve a similar performance as that of the ink produced in Example 1.

Example 1-13

The photoactive monomer used in this example was tetrahydrofurfuryl ethoxylate acrylate (TH(EO)FA). The ink produced in Example 1-13 can achieve a similar performance as that of the ink produced in Example 1.

Example 1-14

The photoactive monomer used in this example was 1,6-hexanediol diacrylate (HDDA). The ink produced in Example 1-14 can achieve a similar performance as that of the ink produced in Example 1.

Example 1-15

The photoactive monomer used in this example was neopentyl glycol propoxylate diacrylate (NPG2PODA). The ink produced in Example 1-15 can achieve a similar performance as that of the ink produced in Example 1.

Example 1-16

The photoactive monomer used in this example was tris(2-(acryloyloxy)ethyl) isocyanurate (THEIC). The ink produced in Example 1-16 can achieve a similar performance as that of the ink produced in Example 1.

Example 1-17

The photosensitizer used in this example was 2-hydroxy-2-methyl-1-phenylpropan-1-one (1173). The ink produced in Example 1-17 can achieve a similar performance as that of the ink produced in Example 1.

Example 1-18

The photosensitizer used in this example was 2,4,6-trimethylbenzoyldiphenyl phosphine oxide (TPO). The ink produced in Example 1-18 can achieve a similar performance as that of the ink produced in Example 1.

Example 1-19

The weather-resistant resin used in this example was an alternating copolymer ZHM-2 (content of fluorine of 26±2%, hydroxyl value (mgKOH/g/solid) of 49-55, and solid content of 60±2%), which was synthesized from chlorotrifluoroethylene and vinyl ether. With polyisocyanate as a curing agent, the obtained weather-resistant resin in example 1-19 can be crosslinked at room temperature or cured through thermal reaction. As such, the ink produced in Example 1-19 can achieve a similar performance as that of the ink produced in Example 1.

Example 1-20

The weather-resistant resin used in this example was an alternating copolymer ZHM-70 (content of fluorine of 25±1%, a hydroxyl value (mgKOH/g/solid) of 49-55, and a solid content of 70±2%), which was synthesized from monomer chlorotrifluoroethylene and monomer vinyl ether. The produced weather-resistant resin in example 1-20 has a high solid content and a low viscosity. It can be crosslinked at room temperature with polyisocyanate as curing agent, or be cured under baking at high temperature with amino or blocking isocyanate as crosslinking agent. As such, the ink produced in Example 1-20 can achieve a similar performance as that of the ink produced in Example 1.

Example 1-21

The weather-resistance resin used in this example was tetrafluoro resin HLR-2H (Jinan hualin chemical Co., Ltd) which is used as coating materials. This weather-resistance was achieved through coupling tetrafluoroethylene monomer with other functional monomer, via introducing functional group into the backbone of fluoro resin, thus, resulting in a good solubility ability in organic solvent or other resin. The resultant weather-resistance resin herein has hydroxyl value (mgKOH/g/solid) of 55±2, solid content of 60±2%, and content of fluorine of >26%. As such, the ink produced in Example 1-21 can achieve a similar performance as that of the ink produced in Example 1.

Example 1-22

The weather-resistant resin used in this example was a solvent-soluble fluorocarbon resin for coating from Asahi Glass Co., Ltd., namely alternating copolymer LF-200 of vinyl fluoride and vinyl ether, which has a hydroxyl value (mgKOH/g/solid) of 32, and a solid content of 60%. As such, the ink produced in Example 1-22 can achieve a similar performance as that of the ink produced in Example 1.

Example 1-23

The weather-resistant resin used in this example was modified polysiloxane resin 818C (solid content of 77±1% and element content of 11.7%) from Shanghai Huarong Chemical Co., Ltd. As such, the ink produced in Example 1-23 can achieve a similar performance as that of the ink produced in Example 1.

Example 1-24

The curing agent used in this example was Duranate TPA-100 from AsahiKASEI, a low-viscosity isocyanate curing agent. As such, the ink produced in Example 1-24 can achieve a similar performance as that of the ink produced in Example 1.

Example 1-25

The curing agent used in this example was TPA-B80X, a blocked isocyanate curing agent. As such, the ink produced in Example 1-25 can achieve a similar performance as that of the ink produced in Example 1.

Example 1-26

The curing agent used in this example was amino resin 325 (solid content of 85%) from Cytec Industries, US. As such, the ink produced in Example 1-26 can achieve a similar performance as that of the ink produced in Example 1.

Example 1-27

The curing agent used in this example was amino siloxane mixture from Shanghai Huarong Chemical Co., Ltd. As such, the ink produced in Example 1-27 can achieve a similar performance as that of the ink produced in Example 1.

Example 2

A scenario-adaptable color-changing ink was provided. In addition to the composition listed above, it also included 2 parts by weight of adhesion promoter. The adhesion promoter was phosphate acrylate, specifically, it was 2-hydroxyethyl methacrylate phosphate PM-2 from nippon kayaku co., Ltd.

Example 2-1

The adhesion promoter used in this example was phosphate acrylate, specifically, it was the monofunctional phosphate acrylate 9106 (Guangzhou Wraio Chemicals Co., Ltd). The ink obtained in Example 2-1 presented a comparable performance as that of the ink produced in Example 2.

Example 2-2

The adhesion promoter used in this example was phosphate acrylate, specifically was the bifunctional phosphate acrylate 9107 (Guangzhou Wraio Chemicals Co., Ltd). The ink obtained in Example 2-2 presented a comparable performance as that of the ink produced in Example 2.

Example 2-3

The adhesion promoter used in this example was methacryloxy silane coupling agent, specifically, it was the silane coupling agent 6030 from Dow corning. The ink obtained in Example 2-3 presented a comparable performance as that of the ink produced in Example 2.

Example 2-4

The adhesion promoter used in this example was amino silane coupling agent, specifically, it was the γ-aminopropyl methyl diethoxysilane KH-902, a domestic amino silane coupling agent. The ink obtained in Example 2-4 presented a comparable performance as that of the ink produced in Example 2.

Example 2-5

The adhesion promoter used in this example was epoxy silane coupling agent, specifically, it was γ-glycidoxypropyl trimethoxysilane KH-560, an epoxy silane coupling agent. The ink obtained in Example 2-5 presented a comparable performance as that of the ink produced in Example 2.

Example 2-6

The adhesion promoter used in this example was methacryloxy silane coupling agent, specifically was acrylic silane coupling agent KH-570, namely γ-methacryloxypropyltrimethoxysilane. The ink obtained in Example 2-6 presented a comparable performance as that of the ink produced in Example 2.

Example 3

A scenario-adaptable color-changing ink was provided. In addition to the composition as listed above, it also included 2 parts by weight of ultraviolet absorber. The ultraviolet absorber could be any commercially available product, for example, the ultraviolet absorber Tinuvin 400 from BASF, Germany.

Example 4

A scenario-adaptable color-changing ink was provided. In addition to the composition as listed above, it also included 0.5 parts by weight of antifoaming agent. The antifoaming agent could be any commercially available product, for example methyl silicone oil 201.

Example 5

| | |
|---|---|
| Polyurethane acrylate EB4680 | 7 parts by weight |
| Isobornyl acrylate (IBOA) | 8 parts by weight |
| 1-hydroxycyclohexyl phenyl ketone (184) | 1 parts by weight |
| Fluorocarbon resin copolymer ZHM-70 | 30 parts by weight |
| Blocked isocyanate curing agent JX-628 | 30 parts by weight |
| Iriodin 7205 interference with gold pearlescent pigment from Merck, Germany | 1 parts by weight |
| γ-glycidoxypropyl trimethoxysilane KH-560 | 1 parts by weight |
| Ultraviolet absorber 1130 | 1 parts by weight |
| 201 methyl silicone oil antifoaming agent | 0.5 parts by weight | scenario-adaptable color-changing ink can be obtained through mixing and high-speedily stirring polyurethane acrylate EB4680, isobornyl acrylate (IBOA), 1-hydroxycyclohexyl phenyl ketone (184), fluorocarbon resin copolymer ZHM-70, blocked isocyanate curing agent JX-628, Iriodin 7205 interference with gold pearlescent pigment from Merck, Germany, ultraviolet absorber 1130, 201 methyl silicone oil antifoaming agent and γ-glycidoxypropyl trimethoxysilane KH-560.

Example 6

| | |
|---|---|
| Polybutadiene dimethacrylate, for example CN301 | 16 parts by weight |
| 1,6-hexanediol diacrylate (HDDA) | 14 parts by weight |
| 2-hydroxy-2-methyl-1-phenylpropan-1-one (1173) | 3 parts by weight |
| Fluorocarbon resin copolymer ZHM-70 | 45 parts by weight |
| Blocked isocyanate curing agent JX-628 | 5 parts by weight |
| Iriodin 7225 interference with blue pearlescent pigment from Merck, Germany | 8 parts by weight |
| Monofunctional phosphate acrylate (9106) | 1.5 parts by weight |
| Ultraviolet absorber 1130 | 1.5 parts by weight |
| 201 methyl silicone oil antifoaming agent | 0.6 parts by weight | scenario-adaptable color-changing in can be obtained through mixing and high-speedily stirring polybutadiene dimethacrylate (for example CN301), 1,6-hexanediol diacrylate (HDDA), 2-hydroxy-2-methyl-1-phenylpropan-1-one (1173), fluorocarbon resin copolymer ZHM-70, blocked isocyanate curing agent JX-628, Iriodin 7225 interference with blue pearlescent pigment from Merck, Germany, ultraviolet absorber 1130, 201 methyl silicone oil antifoaming agent, and monofunctional phosphate acrylate (9106).

Example 7

| | |
|---|---|
| Hydrophobic polyurethane acrylate BR-643 | 30 parts by weight |
| 1,6-hexanediol diacrylate (HDDA) | 20 parts by weight |
| Photosensitizer TPO | 5 parts by weight |
| Tetrafluoro resin HLR-2H | 55 parts by weight |
| Blocked isocyanate curing agent JX-628 | 10 parts by weight |
| Orange pearl powder 2216 from Hebei Oxen New Materials Co., Ltd. | 15 parts by weight |
| γ-glycidoxypropyl trimethoxysilane KH-560 | 3 parts by weight | scenario-adaptable color-changing ink can be obtained through mixing and high-speedily stirring hydrophobic polyurethane acrylate BR-643, 1,6-hexanediol diacrylate (HDDA), photosensitizer TPO, tetrafluoro resin HLR-2H, blocked isocyanate curing agent JX-628, orange pearl powder 2216 from Hebei Oxen New Materials Co., Ltd., ultraviolet absorber 1130, 201 methyl silicone oil antifoaming agent, and γ-glycidoxypropyl trimethoxysilane KH-560.

Example 8

| | |
|---|---|
| Polyurethane acrylate RUA-064S-8 | 15 parts by weight |
| TPGDA | 10 parts by weight |
| 1-hydroxycyclohexyl phenyl ketone (184) | 3 parts by weight |
| Fluorocarbon resin copolymer ZHM-2 | 52 parts by weight |
| Isocyanate curing agent JX-519 | 8 parts by weight |
| Pearl powder (chameleon) VR7503 from Guangdong Volor Pearl Pigment Co., Ltd. | 10 parts by weight |
| Adhesion promoter KH-570 | 1 parts by weight |
| Ultraviolet absorber 1130 | 0.5 parts by weight |
| 201 methyl silicone oil antifoaming agent | 0.5 parts by weight | scenario-adaptable color-changing ink can be obtained through mixing and high-speedily stirring polyurethane acrylate RUA-064S-8, TPGDA, 1-hydroxycyclohexyl phenyl ketone (184), fluorocarbon resin copolymer ZHM-2, isocyanate curing agent JX-519, pearl powder (chameleon) VR7503 from Guangdong Volor Pearl Pigment Co., Ltd., ultraviolet absorber 1130, 201 methyl silicone oil antifoaming agent, and adhesion promoter KH-570.

Example 9

| | |
|---|---|
| Polyurethane acrylate FAO7468 | 15 parts by weight |
| Neopentyl glycol propoxylate diacrylate (NPG2PODA) | 10 parts by weight |
| 1-hydroxycyclohexyl phenyl ketone (184) | 4 parts by weight |
| Fluorocarbon resin copolymer ZHM-2 | 55 parts by weight |
| Isocyanate curing agent JX-519 | 7 parts by weight |
| Iriodin interference with green pearlescent pigment from Merck, Germany | 6 parts by weight |
| γ-aminopropyl methyl diethoxysilane KH-902 | 2 parts by weight |
| Ultraviolet absorber Tinuvin 400 | 0.5 parts by weight |
| 201 methyl silicone oil antifoaming agent | 0.5 parts by weight | scenario-adaptable color-changing inkcan be obtained through mixing and high-speedily stirring polyurethane acrylate FA07468, TPGDA, neopentyl glycol propoxylate diacrylate (NPG2PODA), 1-hydroxycyclohexyl phenyl ketone (184), fluorocarbon resin copolymer ZHM-2, isocyanate curing agent JX-519, Iriodin interference with green pearlescent pigment from Merck, Germany, ultraviolet absorber Tinuvin 400, 201 methyl silicone oil antifoaming agent, and γ-aminopropyl methyl diethoxysilane KH-902.

Comparative Example 1: Example 5 was repeated by replacing Iriodin 7205 interference with gold pearlescent pigment from Merck, Germany with an equal amount of Iriodin 300 non-interference with gold pearlescent pigment while keeping the remaining components constant.

Comparative Example 2: Example 6 was repeated by replacing Iriodin 7225 interference with blue pearlescent pigment from Merck, Germany with an equal amount of metallic aluminum pigment 214 from ECKART while keeping the remaining components constant.

Comparative Example 3: Example 7 was repeated by replacing orange pearl powder 2216 from Hebei Oxen New Materials Co., Ltd. with an equal amount of phthalo blue while keeping the remaining components constant.

The light transmittance of the scenario-adaptable color-changing ink was determined by the Luminous Transmittance and Haze of Transparent Plastics according to GBT 2410-2008.

The visual effect on a dark background is to review the clarity of shape and outline and the brightness of pattern color through visual observation. Evaluation results of excellent and poor were given.

Determination results were as follows:

| Test item | Example 5 | Example 6 | Example 7 | Comparative Example 1 | Comparative Example 2 | Comparative Example 3 |
|---|---|---|---|---|---|---|
| light transmittance | 87% | 88% | 89% | 85% | 4% | 10% |
| visual effect showed on a dark background | desirable | desirable | desirable | poor | desirable | poor |

From the table above, it was found that the scenario-adaptable color-changing ink prepared in Comparative Example 1, in which Iriodin 300 non-interference with gold pearlescent pigment was used to replace Iriodin 7205 interference with gold pearlescent pigment from Merck (Germany), showed a high light transmittance but a poor visual effect on a dark background. The scenario-adaptable color-changing ink prepared in Comparative Example 2, in which the metallic aluminum pigment 214 from ECKART was used to replace Iriodin 7225 interference with blue pearlescent pigment from Merck (Germany), showed an excellent visual effect on a dark background but poor light transmittance, leading to a significance reduce of photoelectric conversion efficiency of silicon crystalline cells. The scenario-adaptable color-changing ink prepared in Comparative Example 3, in which the phthalo blue pigment was used to replace the orange pearl powder 2216 from Hebei Oxen New Materials Co., Ltd., showed a low light transmittance and a poor visual effect on a dark background. The inks in Example 5, 6 and 7 respectively prepared by Iriodin 7205 interference with gold pearlescent pigment from Merck (Germany), Iriodin 7225 interference with blue pearlescent pigment from Merck (Germany), and orange pearl powder 2216 (Hebei Oxen New Materials Co., Ltd.) are able to provide desirable visual effect on a dark background while maintain high light transmittance, therefore, they are suitable for decorating dark blue or black crystalline silicon solar photovoltaic cells.

The above embodiments of the present disclosure have been described in details, but the contents stated are only preferred examples of this present disclosure, thereby, they cannot be considered as limitation for the scope of the present disclosure. All the equivalent modifications and improvements that are made according to the claims of this present disclosure fall within the scope encompassed by the present disclosure.

What is claimed is:

1. A scenario-adaptable color-changing ink,
   wherein the ink comprises 7-30 parts by weight of at least one photopolymer, 8-20 parts by weight of at least one photoactive monomer, 1-5 parts by weight of at least one photosensitizer, 30-55 parts by weight of at least one weather-resistant resin, 1-10 parts by weight of at least one curing agent, 1-15 parts by weight of at least one pearlescent pigment, 0-3 parts by weight of at least one adhesion promoter, 0-3 parts by weight of at least one ultraviolet absorber, and 0-1 part by weight of at least one antifoaming agent,
   wherein the at least one photopolymer is from a group consisting of organosilicon polyurethane acrylate, polybutadiene polyurethane acrylate, cyclic acrylated acrylate, and hydrophobic polyester polyurethane acrylate with 2-6 degrees of functionality,
   wherein the at least one photoactive monomer is from a group consisting of isobornyl acrylate, isobornyl methacrylate, tetrahydrofurfuryl ethoxylate acrylate, 1,6-hexanediol diacrylate, neopentyl glycol propoxylate diacrylate, and tris(2-acryloyloxyethyl) isocyanurate,
   wherein the at least one photosensitizer is from a group consisting of 1-hydroxycyclohexyl phenyl ketone, 2-hydroxy-2-methyl-1-phenyl propan-1-one, and 2,4,6-trimethylbenzoyldiphenyl phosphine oxide,
   wherein the at least one weather-resistant resin is from a group consisting of an amorphous resin, fluorocarbon resin and polysiloxane resin,
   and wherein the at least one curing agent is from a group consisting of amino resin, polyisocyanate, and end-capped hexamethylene diisocyanate.

2. The scenario-adaptable color-changing ink according to claim 1, wherein the at least one pearlescent pigment is from a group consisting of interference pearlescent pigments.

3. The scenario-adaptable color-changing ink according to claim 1, wherein the at least one pearlescent pigment is from a group consisting of natural mica, synthetic mica and transparent glass substrate.

4. The scenario-adaptable color-changing ink according to claim 1, wherein the at least one adhesion promoter is from a group consisting of phosphate acrylate, amino silane coupling agent, methacryloxy silane coupling agent, and epoxy silane coupling agent.

5. A solar glass product comprising a substrate, wherein the scenario-adaptable color-changing ink according to claim 1 is printed on the substrate.

6. The solar glass product according to claim 5, wherein the substrate is a glass substrate.

* * * * *